S. F. ZYSSET.
APPARATUS FOR BURNING STUMPS.
APPLICATION FILED MAR. 12, 1914.
1,141,747.
Patented June 1, 1915.
2 SHEETS—SHEET 1.
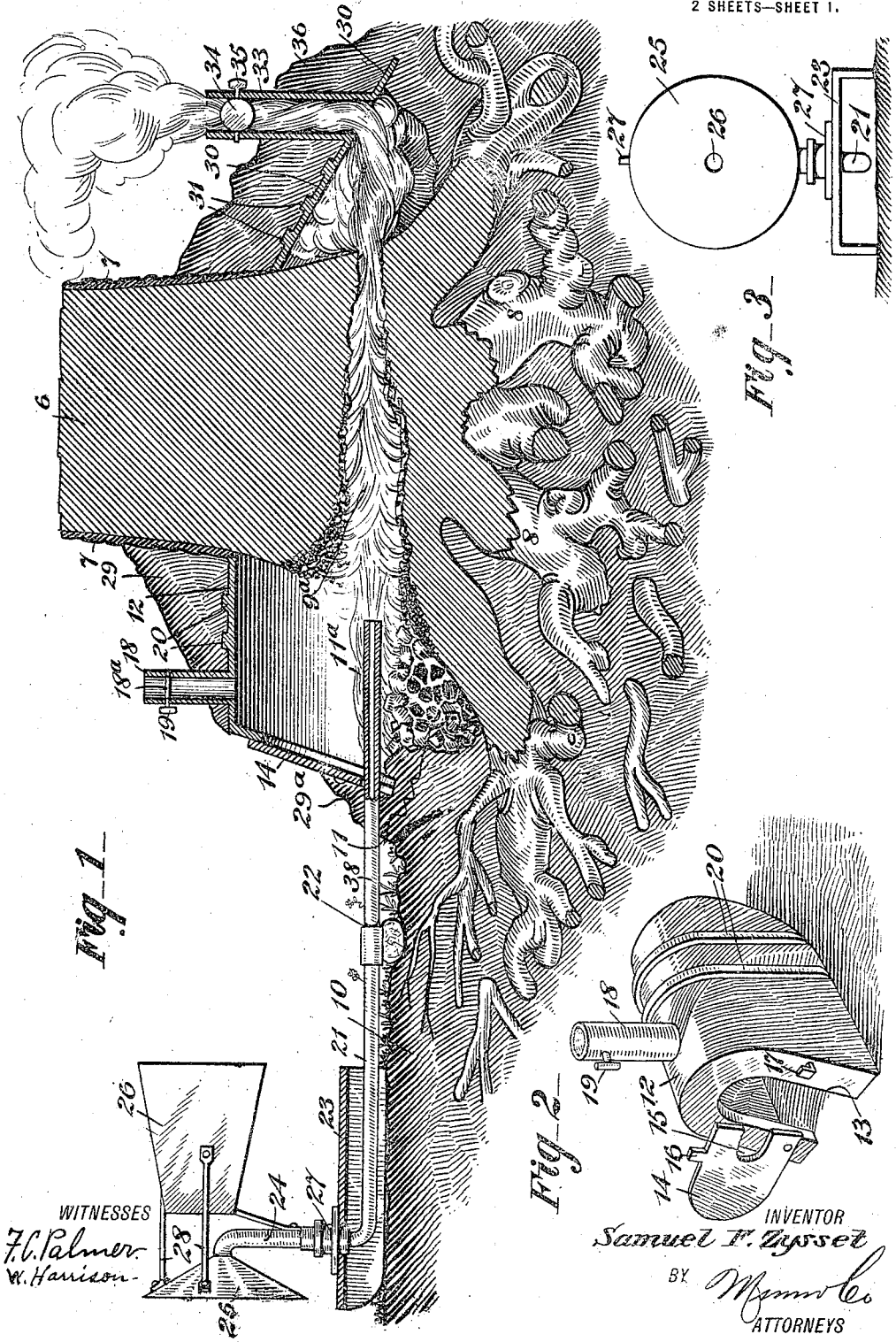
INVENTOR
Samuel F. Zysset
BY
ATTORNEYS
WITNESSES
F. C. Palmer
W. Harrison

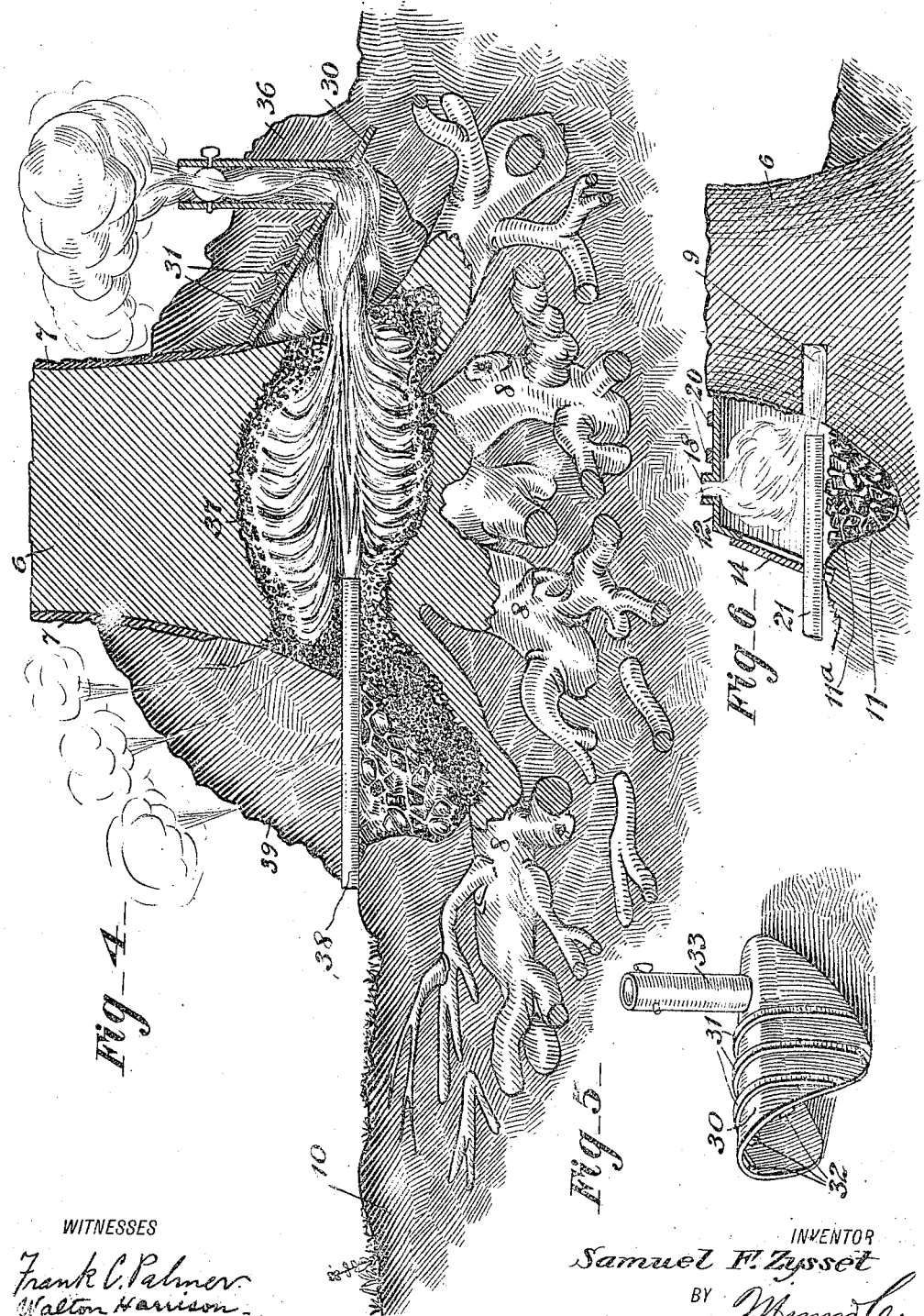

UNITED STATES PATENT OFFICE.

SAMUEL F. ZYSSET, OF THOMAS, OREGON.

APPARATUS FOR BURNING STUMPS.

1,141,747.  Specification of Letters Patent.  Patented June 1, 1915.

Application filed March 12, 1914. Serial No. 824,153.

*To all whom it may concern:*

Be it known that I, SAMUEL F. ZYSSET, a citizen of the United States, residing at Thomas, in the county of Linn and State of Oregon, have invented an Improved Apparatus for Burning Stumps, of which the following is a specification.

My invention relates to the burning of stumps of trees, and is of special value in relation to the destruction of stumps for the purpose of clearing land.

Considerable time and labor is ordinarily required in order to destroy stumps by burning them, owing largely to the fact that the stumps are usually green or unseasoned, and there is difficulty in causing them to undergo combustion, and especially those portions of the stump which are close to the surface, or below the surface, of the ground.

In burning a stump, it is desirable that the combustion shall destroy the large mass of woody fiber just below the surface of the ground and commonly designated as the root system of the stump or tree. Yet considerable difficulty is experienced in supplying air to the root system in such manner as to promote the thorough combustion thereof.

By my invention I seek to burn not only the entire upper portion of the stump, but also the root system, and even to destroy individual roots of large size.

Reference is made to the accompanying drawings forming a part of this specification, and in which like numerals indicate like parts.

Figure 1 is a longitudinal section through a stump, and one form of apparatus which I employ to facilitate the combustion thereof. Fig. 2 is a perspective of a stump furnace which I employ, and which is to be located upon one side of the stump. Fig. 3 is an elevation showing a device for supplying air to the stump during the combustion thereof. Fig. 4 is a longitudinal section through a stump and the mechanism used for destroying the same, this view representing the condition of the stump after the combustion has progressed to a considerable extent. Fig. 5 is a perspective showing a draft member used for facilitating the draft of air through the fire during the combustion of the stump. Fig. 6 is a fragmentary section through the stump and parts adjacent thereto, when the auger hole is first bored and the fire is built adjacent thereto.

The body of the stump is shown at 6, and the bark thereof at 7—the bark being cut away around the base of the stump. A number of large roots, integral with the body of the stump and branching downwardly therefrom, are shown at 8. These roots together constitute the root system of the stump. A hole 9 is bored into the lower portion of the stump, at or near the surface of the ground. This hole extends only through the sapwood, and in the case of a large stump may extend perhaps six inches into the same. The hole may be of any desired diameter, but for practical purposes, in operating upon stumps of considerable size, a two-inch auger hole may be employed. The ground is shown at 10, and at 11 is an excavation located upon one side of the stump 6, and used for holding fuel, the latter being shown at 11$^a$, and being of any kind suitable for the purpose. A furnace body is shown at 12, and is made of metal and has preferably the form shown in Fig. 2. This furnace body is essentially a hood, which is open at its bottom and at one end, the opposite end being provided with a doorway 13. A door 14 is pivotally mounted upon the hood, and is provided with a hole 15 and with a lug 16. Another lug 17 is mounted rigidly upon the hood, and is adapted to be engaged by the lug 16 whenever the door 14 is turned in a clockwise direction according to Fig. 2. With the door 14 open, as indicated in Fig. 2, fuel may be placed within the hood. A draft pipe 18 extends upwardly from the hood 12, and is used for purposes of a chimney, as hereinafter described. A disk damper 18$^a$ is adjustably mounted within the draft pipe 18, and is provided with a handle 19 whereby it may be turned, in order to regulate the draft of hot air and smoke passing upwardly through the draft pipe 18$^a$. The hood 12 is provided with strengthening ribs 20, each having substantially the form of an arch. A pipe section is shown at 21, and in conjunction with another pipe section 38 hereinafter mentioned, is used for supplying air to the fire. These pipe sections may, if desired, be supported partially upon a small log 22.

The pipe, made up of the pipe sections 21 and 38, extends into close proximity to the hole 9, and has an internal diameter less than that of the hole, as indicated in Fig. 6. The pipe is in registry with the hole 9, and when the hole is enlarged by burning, as hereinafter described, the pipe section 38 may be advanced into it.

The pipe section 21 is provided with a portion 24 which extends upwardly and carries a wind funnel 25 and a vane 26. By aid of a bearing 27 these parts are free to turn. Braces 28 extend from the wind funnel 25 to the vane 26. When the wind blows from any direction, air flows through the pipe and causes aspiration through the hole 9.

At 29 and 29ª are charges of earth, piled up and around the hood 12 and covering the adjacent portion of the stump. This renders the hood almost air tight, and serves to concentrate and localize the heat generated within the furnace or hood 12, so as to apply said heat most effectively to the task of consuming the stump.

After the stump is burned through I place, upon the side of the stump opposite the location of the hood 12, a second hood 30, having roughly the form of a saddle, as will be understood from Fig. 5, and provided with braces 31 having the form of arches. This hood is also provided with braces 32, extending substantially parallel with each other and crossing the braces 31. A smoke pipe 33 is carried by the hood 30, and extends upwardly from the same. Revolubly mounted within the smoke pipe 33 is a disk damper 34, which is provided with a handle 35 whereby it may be turned or adjusted. A quantity of earth 36 may be piled over the hood 30—this being done, however, some time after the charges of earth 29 and 29ª are placed upon and around the opposite portion of the stump.

After the combustion has been carried on for some time, the auger hole 9 becomes much enlarged as shown at 9ª, and afterward it assumes the form of a cavity 37, of more or less irregular form, as indicated in Fig. 4. At an advanced stage of the combustion, the hood 12 is removed and a charge of earth 39 takes its place, as shown at the left of Fig. 4. The pipe section 21 is also withdrawn, in order that, together with the mechanism shown at the left of Fig. 1, it may be carried to some other part of the field, and used for destroying another stump. The single pipe section 38 is left in place, and from time to time is pushed into the cavity 37 to any desired extent, as the combustion proceeds, and as may be understood from Fig. 4.

The operation of my device is as follows: The dirt having been cleared away from two opposite sides of the stump 6, the excavation 11 having been made, and the auger hole 9 bored into the stump, as shown in Fig. 6, a fire is kindled in the excavation 11 and is kept burning by fuel 11ª. This fuel may, if desired, be merely a collection of dry fagots. The hood 12 is next placed over the fire. The base 23, with parts carried by it, is located as shown at the left of Fig. 1. The pipe sections 21 and 38 are placed in registry, or coupled together. The parts thus remain until the burning of the fire is well advanced, and the portion of the pipe 38 within the fire becomes red hot. The door 14 is now closed, the pipe section 38 being extended through the hole 15. Dirt is next piled over and around the hood 12, as shown at 29. As the fire burns, the flames thereof extend into the auger hole 9, and if the wind blows, a current of air is forced through the pipe, comprising the pipe sections 21 and 38. By turning the damper 18ª by aid of the handle 19, the draft may be adjusted at will. As the flames pass into the auger hole 9 and out through the pipe 18, now serving as a chimney, the hole becomes enlarged, as shown at 9ª in Fig. 1, and is gradually burned through the tree. The wood bounding the hole first becomes dry or seasoned, next charred, and finally reduced to ashes. The enlarged hole 9ª is thus gradually converted into the cavity 37. When the hole is burned entirely through the stump and is of considerable mean diameter—say four to six inches—the hood 30 is placed in position, and the quantity of dirt 36 is piled upon this hood. By adjusting the damper 34 a suitable draft is caused to take place through the pipe 33, which serves as a chimney. After the cavity 37 becomes of considerable size, as indicated in Fig. 4, the pipe section 21 and base 23, together with parts associated therewith, are removed and carried to some other part of the field, where they are used for treating other stumps in accordance with my invention. The pipe section 38 being left, is gradually pushed or fed into the enlarging cavity, and used for supplying air to burn the stump. Sooner or later the bottom portion of the stump 6 is thus burned away, and the top portion of the stump settles down into the bed of hot coals below it. The stump, being of combustible wood, largely supplies its own fuel, and is therefore self-consumed. At the same time the adjacent or upper portions of the roots 6 are thoroughly consumed, the root system of the stump being thus effectively destroyed. I find that by aid of my invention an average hand is able to dispose of as many large stumps every day as he can fire and bank, in the manner described.

I do not limit myself to the precise construction shown, as variations may be made therein without departing from the spirit of my invention.

Having thus described my invention, what I claim as new and desire to secure by Letters Patent is as follows:

1. In a stump burner, the combination of a furnace provided with a combined draft and smoke outlet and open at its bottom and at one end to be located against one side of a stump, an air inlet pipe extending into the lower part of said furnace with its inner end in close proximity to the stump and movable progressively therethrough to supply air to the stump as a hole is burned therethrough and mechanism for directing a current of air into said air inlet pipe.

2. In a stump burner, the combination with a furnace adapted to be located against one side of a stump, an air pipe movably extending into the lower portion thereof with its inner end in close proximity to the stump, of a wind inlet funnel connected to said pipe, a supporting member carrying said wind funnel and movable bodily toward and away from the stump, and a wind controlled vane for shifting said funnel into position to receive the air and direct the same through the air inlet pipe into the furnace.

3. In a stump burner, the combination of furnace to be located upon one side of a stump, a hood to be located upon the opposite side of said stump and provided with an outlet for the products of combustion, and a draft pipe extending into said furnace to facilitate the burning of a hole through the stump, and a wind funnel connected with said draft pipe and movable bodily therewith toward and from said stump.

4. In a stump burner, the combination of a furnace to be located upon one side of a stump, draft inducing mechanism comprising a hood to be located upon the opposite side of said stump and provided with an outlet for products of combustion, a draft pipe movably extending into the lower part of said furnace through the door thereof and movable bodily toward said stump, said draft pipe being admitted through an open end slot in said furnace door to facilitate the removal of said furnace and its replacement with a charge of earth after a hole is burned through said stump.

In testimony whereof I have signed my name to this specification in the presence of two subscribing witnesses.

SAMUEL F. ZYSSET.

Witnesses:
W. L. MARKS,
LEILA MITCHELL.